(12) United States Patent
Liang et al.

(10) Patent No.: US 7,704,047 B2
(45) Date of Patent: Apr. 27, 2010

(54) COOLING OF TURBINE BLADE SUCTION TIP RAIL

(75) Inventors: George Liang, Palm City, FL (US); Ralph Warren Mathews, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 684 days.

(21) Appl. No.: 11/602,683

(22) Filed: Nov. 21, 2006

(65) Prior Publication Data
US 2008/0118367 A1    May 22, 2008

(51) Int. Cl.
*F01D 5/18* (2006.01)
(52) U.S. Cl. ................................. 416/97 R
(58) Field of Classification Search ............ 416/92, 416/96 R, 97 R; 415/115
See application file for complete search history.

(56) References Cited

U.S. PATENT DOCUMENTS

| | | | |
|---|---|---|---|
| 4,390,320 A * | 6/1983 | Eiswerth | 416/97 R |
| 5,382,133 A | 1/1995 | Moore et al. | |
| 5,564,902 A * | 10/1996 | Tomita | 416/97 R |
| 6,183,199 B1 * | 2/2001 | Beeck et al. | 416/97 R |
| 6,602,052 B2 * | 8/2003 | Liang | 416/97 R |
| 6,790,005 B2 * | 9/2004 | Lee et al. | 416/97 R |
| 6,916,150 B2 | 7/2005 | Liang | |
| 6,971,851 B2 | 12/2005 | Liang | |
| 6,988,872 B2 | 1/2006 | Soechting et al. | |
| 7,192,250 B2 * | 3/2007 | Boury et al. | 416/97 R |

* cited by examiner

*Primary Examiner*—Ninh H Nguyen

(57) ABSTRACT

A turbine blade including an airfoil, the airfoil including an airfoil outer wall having pressure and suction sidewalls joined together at chordally spaced apart leading and trailing edges extending radially outwardly from a blade root to a blade tip surface. A continuous squealer tip rail extends radially outwardly from and substantially continuously around the blade tip surface forming a radially outwardly open squealer pocket. The squealer tip rail includes an aft portion adjacent to the trailing edge, where the pressure side tip rail is discontinued in the chordal location of the aft portion. A plurality of chordally spaced film cooling holes are provided in a surface of the suction sidewall and provides a cooling fluid flow along the aft portion of the squealer tip rail surface to define a sub-boundary layer or film of cooling fluid between a hot gas vortex flow and the aft portion of the squealer tip rail at the suction sidewall.

20 Claims, 3 Drawing Sheets

COOLING OF TURBINE BLADE SUCTION TIP RAIL

FIELD OF THE INVENTION

The present invention relates generally to turbine blades and, more particularly, to cooling of a surface of a turbine blade.

BACKGROUND OF THE INVENTION

In a turbomachine, such as a gas turbine engine, air is pressurized in a compressor then mixed with fuel and burned in a combustor to generate hot combustion gases. The hot combustion gases are expanded within the turbine section where energy is extracted to power the compressor and to produce useful work, such as powering a propeller for an aircraft in flight or turning a generator to produce electricity. The hot combustion gas travels through a series of turbine stages. A turbine stage may include a row of stationary vanes followed by a row of rotating turbine blades, where the turbine blades extract energy from the hot combustion gas for powering the compressor and providing output power. Since the turbine blades are directly exposed to the hot combustion gas, they are typically provided with internal cooling circuits which channel a coolant, such as compressor bleed air, through the airfoil of the blade and through various film cooling holes around the surface thereof. One type of airfoil extends from a root at a blade platform, which defines the radially inner flowpath for the combustion gas, to a radially outer cap or blade tip section, and includes opposite pressure and suction sides extending axially from leading to trailing edges of the airfoil. The cooling circuit extends inside the airfoil between the pressure and suction sides and is bounded at its top by the blade tip section.

The gas turbine engine efficiency is, at least in part, dependant upon the extent to which the high temperature gases leak across the gap between the turbine blade tips and the seals or shrouds which surround them. The leakage quantity is typically minimized by positioning the radially-outward blade tip section in close proximity to the outer air seal. However, differential thermal elongation and dynamic forces between the blade tip section and outer air seal can cause rubbing therebetween. Also, it should be noted that the heat load on the turbine blade tip section is a function of leakage flow over the blade tip section. Specifically, a high leakage flow will induce a high heat load to the blade tip section, such that gas leakage across the blade tip section and cooling of the blade tip section have to be addressed as a single problem. In a typical construction, the blade tip section of an airfoil may be provided with a squealer tip rail extending radially outwardly a short distance from the blade tip section, and extending substantially completely around the perimeter of the airfoil to define an inner squealer tip pocket facing radially outwardly. The squealer tip rail is located radially closely adjacent to a stationary outer seal wall, or outer turbine shroud, to provide a relatively small clearance gap therebetween to seal or restrict the flow of gas across the blade tip section.

The squealer tip rail is a solid metal projection of the airfoil, and is directly heated by the combustion gas which flows thereover. In addition, a vortex flow of hot gases is typically formed on the suction side of the airfoil adjacent the blade tip, where the size of the vortex generally increases toward the aft end, i.e., the trailing edge, of the airfoil. The squealer tip rail is cooled by a cooling fluid, such as air, channeled from an airfoil cooling circuit to the blade tip section to convect heat away the area of the squealer tip pocket. Convective cooling holes may be provided in the squealer tip pocket located along the squealer tip rail. In addition, heat from the squealer tip rail may be conducted into the squealer tip section and convected away internally of the airfoil by the cooling fluid channeled through the internal cooling circuit. The squealer tip section, including the squealer tip rail, typically operates at temperatures above that of the remainder of the airfoil and can be a life limiting element of the airfoil in a hot turbine environment. In particular, it is known in the art that the portion of the airfoil located at the intersection of the pressure side airfoil surface and the blade tip section is subject to very high heat loads and accordingly is more likely to experience thermal distress. Accordingly, there is a continuing need to provide effective cooling to the surfaces of the blade tip section, and particularly to the squealer tip rail.

SUMMARY OF THE INVENTION

In accordance with one aspect of the invention, a turbine blade is provided comprising an airfoil including an airfoil outer wall extending radially outwardly from a blade root. A blade tip surface is located at an end of the airfoil distal from the root, and includes pressure and suction sides joined together at chordally spaced apart leading and trailing edges of the airfoil. A squealer tip rail extends radially outwardly from the blade tip surface and includes an aft portion extending chordally between the leading edge and the trailing edge adjacent to the trailing edge. A plurality of chordally spaced film cooling holes are provided in a surface of the suction side and provide a flow of cooling fluid along the squealer tip rail surface at the suction side.

In accordance with another aspect of the invention, a turbine blade is provided comprising an airfoil including an airfoil outer wall with pressure and suction sidewalls. The pressure and suction sidewalls are joined together at chordally spaced apart leading and trailing edges of the airfoil and extend radially outwardly from a blade root to a blade tip surface. The blade tip surface includes pressure and suction sides coinciding with the pressure and suction sidewalls. A continuous squealer tip rail extends radially outwardly from and substantially continuously around the blade tip surface forming a radially outwardly open squealer pocket. The squealer tip rail includes an aft portion extending chordally between the leading edge and the trailing edge adjacent the trailing edge. A plurality of chordally spaced film cooling holes are provided in a surface of the suction side and provide a flow of cooling fluid along the aft portion of the squealer tip rail surface at the suction side.

In accordance with a further aspect of the invention, a turbine blade is provided comprising an airfoil including an airfoil outer wall with pressure and suction sidewalls. The pressure and suction sidewalls are joined together at chordally spaced apart leading and trailing edges of the airfoil and extend radially outwardly from a blade root to a blade tip surface. The blade tip surface includes pressure and suction sides coinciding with the pressure and suction sidewalls. A continuous squealer tip rail extends radially outwardly from and substantially continuously around the blade tip surface forming a radially outwardly open squealer pocket. The squealer tip rail includes an aft portion extending chordally between the leading edge and the trailing edge adjacent the trailing edge. At least one film cooling hole is provided in fluid communication with a cooling fluid circuit within the airfoil. The at least one film cooling hole comprises a shaped hole defined by diverging walls, extending in a downstream direction of the cooling fluid flow, to form a film sub-boundary layer along the squealer tip rail surface at the suction side.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

The present invention provides a construction for the blade tip section of a rotating blade for a combustion gas turbine, where the blade tip section includes a squealer tip rail that is configured to provide a reduction in the vena contractor associated with secondary leakage flow passing the blade tip section. The geometry of the squealer tip rail operates in combination with an injected cooling flow to reduce blade leakage flow and heat load.

Figure 1:
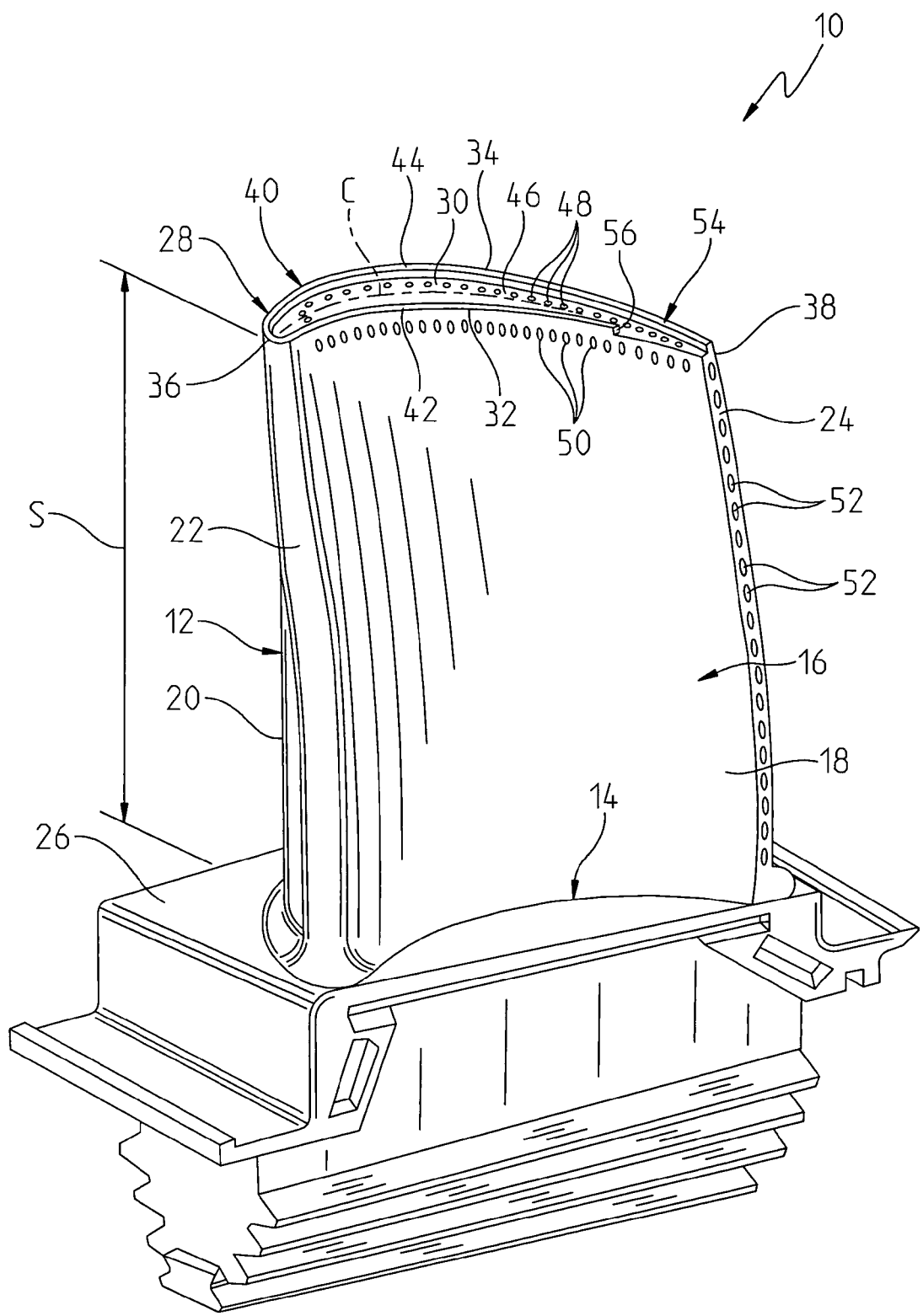
FIG. 1 is a perspective view of a representative turbine blade including a squealer tip rail illustrated for describing the principles of the present invention.

Referring to FIG. 1, an exemplary turbine blade 10 for a gas turbine engine is illustrated. The blade 10 includes an airfoil 12 and a root 14 which is used to conventionally secure the blade 10 to a rotor disk of the engine for supporting the blade 10 in the working medium flow path of the turbine where working medium gases exert motive forces on the surfaces thereof. The airfoil 12 has an outer wall 16 comprising a pressure sidewall 18 and a suction sidewall 20. The pressure and suction sidewalls 18, 20 are joined together along an upstream leading edge 22 and a downstream trailing edge 24, where the leading and trailing edges 22, 24 are spaced axially or chordally from each other with respect to a chordal direction C. The airfoil 12 extends radially along a longitudinal or radial direction of the blade 10, defined by a span S of the airfoil 12, from a radially inner airfoil platform 26 to a radially outer squealer tip cap or squealer tip section 28.

The squealer tip section 28 includes a blade tip surface 30 having an airfoil shape, and pressure and suction sides 32, 34 which are joined together at chordally spaced apart leading and trailing edges 36, 38 of the squealer tip section 28. The pressure and suction sides 32, 34 coincide with the pressure and suction sidewalls 18, 20, respectively, of the airfoil 12. A squealer tip rail 40 extends radially outwardly from the blade tip surface 30 and comprises a pressure side tip rail 42 and a suction side tip rail 44. The pressure side tip rail 42 and suction side tip rail 44 define a substantially continuous wall extending outwardly from and around the periphery of the outer wall 16, to form a radially outwardly open main squealer tip pocket 46 therein.

Squealer pocket cooling holes 48 are formed in the blade tip surface 30 within the main squealer tip pocket 46 to provide a cooling fluid flow in a conventional manner from a cooling fluid circuit 49 extending through the airfoil 12 and in fluid communication with the squealer pocket cooling holes 48. The squealer pocket cooling holes 48 generally extend along the periphery of the main squealer tip pocket 46 adjacent to the pressure side tip rail 42 and suction side tip rail 44 for providing a cooling flow to the squealer tip rail 40. However, it should be understood that the present invention is not limited to the particular arrangement of squealer pocket cooling holes 48 disclosed herein, and other cooling flow arrangements or structures may be provided for cooling the squealer tip rail 40.

The outer wall 16 of the airfoil 12 may be provided with a plurality of film cooling holes 50 in the pressure sidewall 18 substantially adjacent an intersection of the outer wall 16 and the pressure side 32 of the squealer tip section 28. The film cooling holes 50 are in fluid communication with the cooling fluid circuit 49 in the airfoil 12 and provide a cooling fluid flow that may flow upwardly along the outer wall 16 of the airfoil 12 and pass over the outer surface and the radial outer edge of the pressure side tip rail 42. In addition, cooling holes 52 may also be provided along the trailing edge of the airfoil 12 and in fluid communication with the cooling fluid circuit 49.

Figure 2:
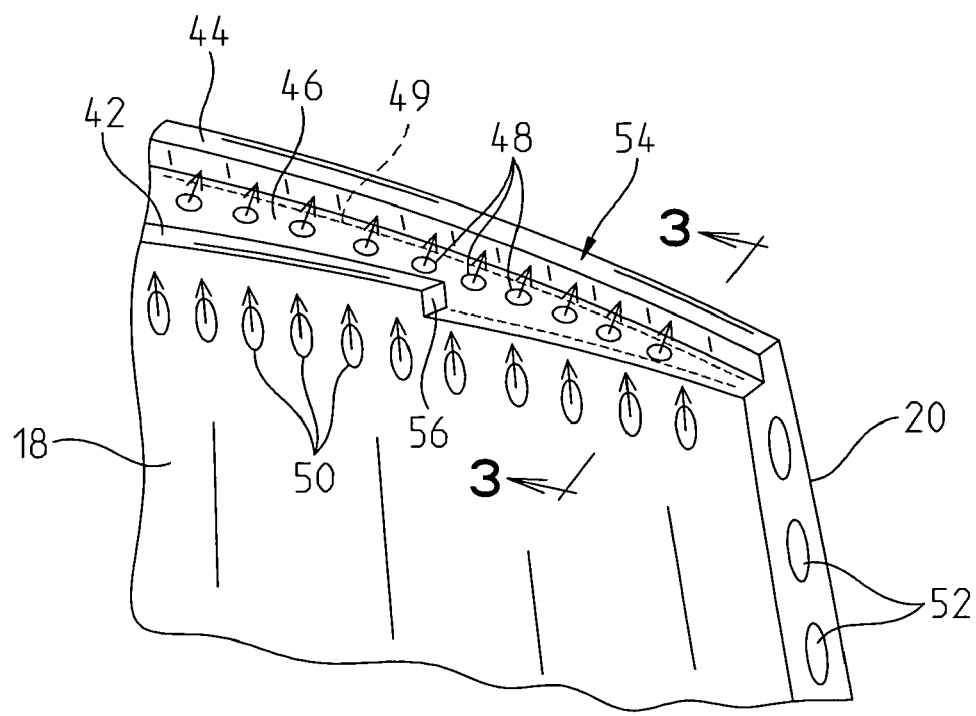
FIG. 2 is an enlarged perspective view of the trailing end of the turbine blade of FIG. 1.

Referring further to FIG. 2, the squealer tip rail 40 further comprises an aft portion 54 extending along a chordal location adjacent the trailing edge 38 of the squealer tip section 28. The chordal location of the aft portion 54 is generally defined by a portion of the squealer tip rail 40 where the pressure side tip rail 42 is discontinued at a location 56 between the leading and trailing edges 36, 38, adjacent the trailing edge 38.

Figure 3:
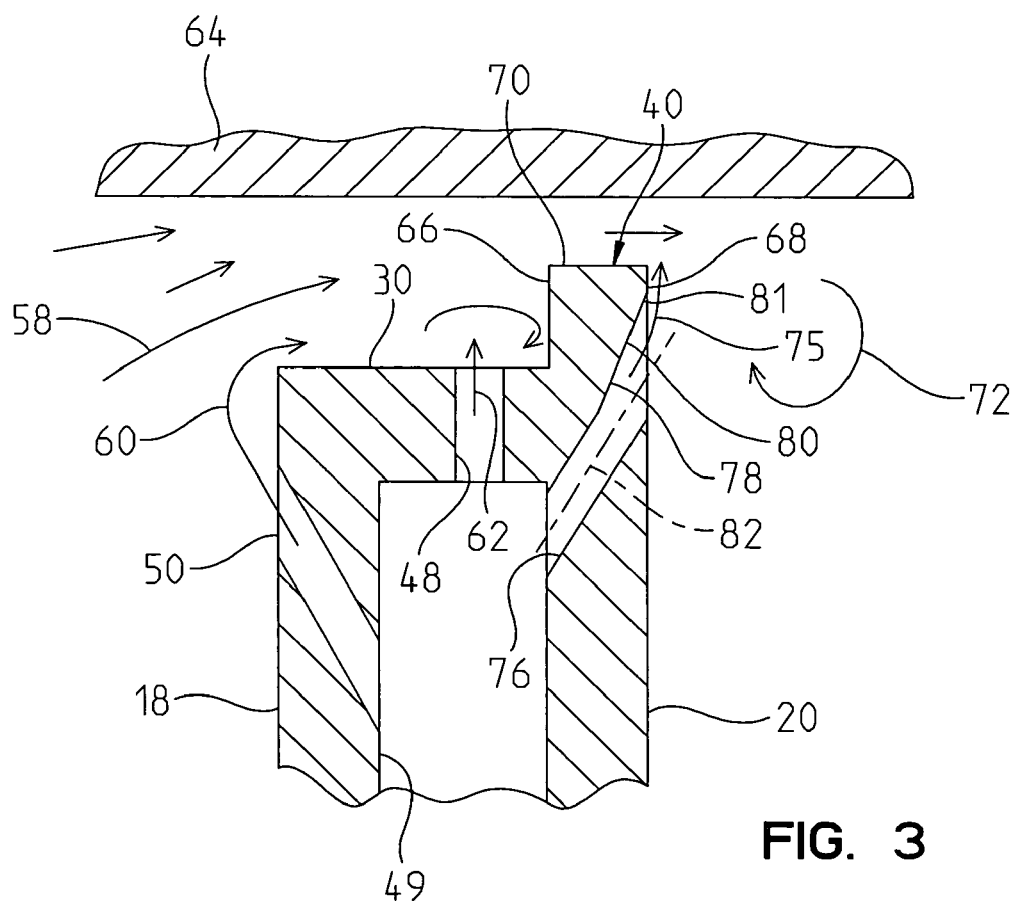
FIG. 3 is a cross-sectional view taken along line 3-3 in FIG. 2.

As is illustrated in FIGS. 2 and 3, a streamwise secondary leakage flow 58 occurs, mixing with cooling fluid flow 60 from the film cooling holes 50 and cooling fluid flow 62 from the squealer pocket holes 48, and passing outwardly between an outer turbine shroud 64 and the squealer tip rail 40. As a result primarily of the squealer pocket geometry and the interaction of hot gas secondary flow mixing, the effectiveness of the cooling fluid provided from the pressure side film holes 50 and from the cooling holes 48 in the bottom of the squealer tip pocket 46 at the aft end 54 is very limited, such that the aft end 54 of the squealer tip rail 40 is substantially exposed to heating from three sides. That is, the pressure side 66, the suction side 68 and the outer surface 70 of the squealer tip rail 40 may be exposed to substantial heating. In particular, a relatively large vortex flow 72 associated with the secondary hot gas flow 58 over the outer surface 70 the squealer tip rail 40 provides substantial heating to the aft end 54 of the squealer tip rail 40. As a consequence, the blade trailing edge tip section has generally exhibited increased oxidation and erosion, with an observed adverse affect on the operating life of the turbine blade 10.

Figure 4:
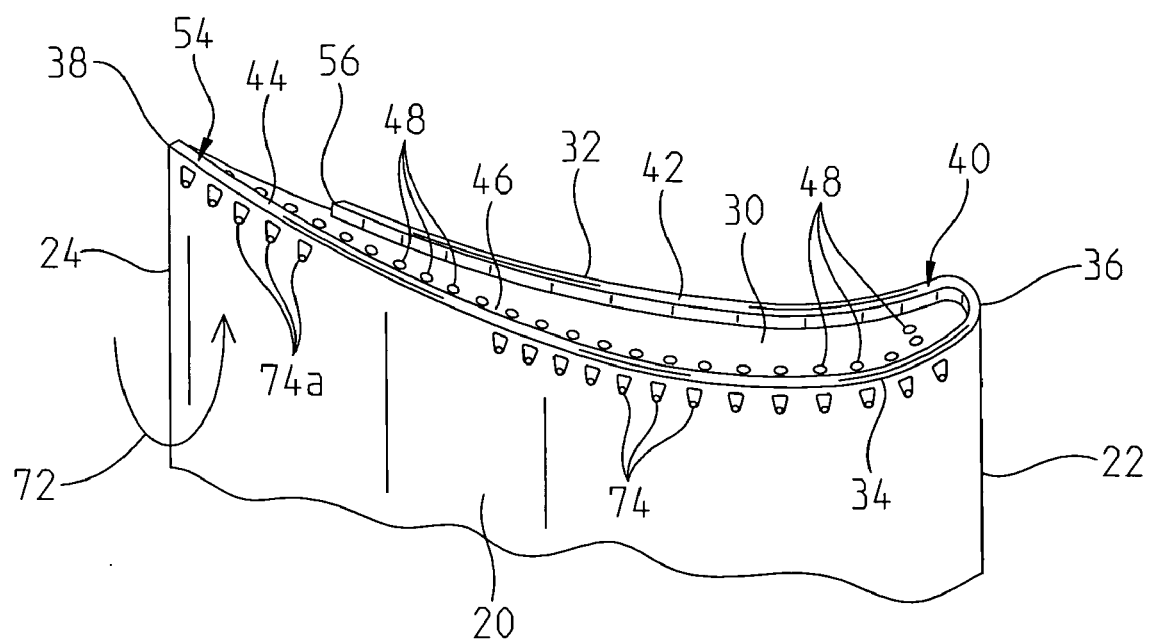
FIG. 4 is a perspective of an upper portion of the suction side of the turbine blade.

As seen in FIGS. 3 and 4, the outer wall 16 of the airfoil 12 may be provided with a plurality of chordally spaced suction side film cooling holes 74 in the suction sidewall 20 substantially adjacent the squealer tip rail 40 to provide film cooling to the squealer tip rail 40 between the leading and trailing edges 36, 38 of the squealer tip rail 40. Further, at least one film cooling hole 74a, and preferably a plurality of spaced film cooling holes 74a, is provided along a chordal length of the suction side tip rail 44 of the airfoil 12 substantially extending from the chordal location 56, where the pressure side tip rail 42 is discontinued, to the trailing edge 38 of the squealer tip rail 40. As is described further below, the suction side film cooling holes 74 are configured to discharge cooling fluid from the fluid circuit 49 in a direction and at a flow rate that causes the cooling fluid to form a film that exits generally parallel to the suction sidewall 20, and to disperse across the surface of the suction side 68 of the squealer tip rail 40 and to form a sub-boundary layer flow or cooling fluid film between the vortex flow 72 and the squealer tip rail 40.

Referring in particular to FIG. 3, one of the cooling holes 74a is illustrated and extends at a radially outward angle relative to the outer wall 16 in a downstream direction, i.e., in the direction of cooling fluid flow 75 exiting the cooling hole 74a. The cooling hole 74a preferably comprises a metering section 76 connected to the cooling fluid circuit 49 followed by a diffusing section 78. The diffusing section 78 is connected to the suction sidewall 20 and comprises at least one diverging wall, such as a wall 80 diverging relative to a centerline 82 of the cooling hole 74a, and may include plural diverging walls, to reduce the flow velocity of the cooling fluid as it exits the cooling hole 74a. For example, the cooling hole 74a may be formed in accordance with the teachings of U.S. Pat. No. 6,183,199, which patent is incorporated herein by reference.

Since excessive penetration of the cooling fluid into the hot vortex flow 72 adjacent the suction sidewall 20 may result in the cooling fluid mixing with the vortex flow 72 and being swept away from the surface of the suction sidewall 20, as opposed to remaining attached thereto as a film of cooling fluid forming a sub-boundary layer downstream of the outlet of the cooling hole 74a, it is preferable that the centerline 82 of the cooling hole 74a be oriented at a shallow angle of between about 10° and about 50°, preferably between about 15° and about 40°, and particularly preferably between about 20° and about 35°, relative to the plane of the suction sidewall 20. The shallow angle of the cooling hole 74a is provided to facilitate the cooling fluid flow 75 exiting at an angle that it is believed will result in a flow of the cooling fluid that is generally parallel the suction sidewall 20 and that will remain substantially attached to the suction side 68 of the squealer tip rail 40. In addition, it is preferable that the cooling hole 74a be provided as a shaped cooling hole having a diverging section 78 to facilitate attachment of the cooling fluid flow 75 to the suction side 68 of the squealer rail 40 and that will decrease the flow velocity of the cooling fluid flow 75 exiting the cooling hole 74a, as well as to cause the cooling fluid flow 75 to disperse or spread outwardly from the cooling hole 74a in a chordal direction across the surface of the suction side 68 of the squealer tip rail 40. In the embodiment described herein, the exit of the cooling hole 74a is located such that at least the downstream edge 81 thereof is located in the surface of the suction side 68 of the squealer tip rail 40, i.e., is located in the squealer tip rail 40 at a spanwise location radially outwardly from the squealer tip pocket 46. In accordance with one embodiment of the invention, the exit of the cooling hole 74a may be located approximately 0.030 inch (0.076 cm) from the outer surface 70 of the squealer tip rail 40. Further, the centerline 82 of the cooling hole 74a may be slanted in a direction toward the trailing edge 24 of the blade 10 and, in particular, may be slanted at an angle of up to about 45° from perpendicular to the suction sidewall 20. The remaining suction side film cooling holes 74 may be formed with a configuration substantially similar to that described herein for the cooling hole 74a.

It should be understood that the blade cooling, providing film cooling to the suction side of the squealer tip rail 40, is not limited to the particular embodiment(s) of cooling holes 74 described herein, and other configurations of passages for distributing a cooling fluid to the suction side 68 of the squealer tip rail 40 may be provided. In particular, in accordance with the principles of the present description, structure is provided for discharging a cooling fluid in such a manner that is believed to form a sub-boundary layer across the suction side 68 of the squealer tip rail 40, with the goal of avoiding cooling losses that may occur as a result of mixing of cooling fluid with secondary hot gas flows, such as suction side vortex flows 72. Further, although cooling of the aft end 54 of a squealer tip rail 40 is specifically referenced as a particular problem addressed by the present invention, other locations along the suction side 68 of the squealer tip rail 40 may additionally incorporate the teachings herein to provide cooling along portions of the squealer tip rail 40 affected by heating from secondary hot gas flows.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine blade comprising:
  an airfoil including an airfoil outer wall extending radially outwardly from a blade root;
  a blade tip surface located at an end of said airfoil distal from said root, and including pressure and suction sides joined together at chordally spaced apart leading and trailing edges of said airfoil;
  a squealer tip rail extending radially outwardly from said blade tip surface and including an aft portion extending chordally between said leading edge and said trailing edge adjacent said trailing edge; and
  a plurality of chordally spaced film cooling holes provided in a surface of said suction side and providing a flow of cooling fluid along said squealer tip rail surface at said suction side, wherein said film cooling holes are located in at least a portion of said squealer tip rail.

2. The blade of claim 1, wherein said cooling fluid exiting said film cooling holes form a film sub-boundary layer along said suction side, flowing in the same direction as a vortex flow formed by a hot fluid flow over said blade tip surface.

3. The blade of claim 2, wherein said film cooling holes are in communication with a cooling fluid circuit within said airfoil, said film cooling holes comprising shaped holes defined by diverging walls including said at least a portion of said squealer tip rail, extending in a downstream direction of cooling fluid flow, to form said film sub-boundary layer.

4. The blade of claim 1, wherein said film cooling holes are located adjacent said aft portion of said squealer tip rail.

5. The blade of claim 4, wherein said squealer tip rail comprises a pressure side tip rail and a suction side tip rail, said aft portion being formed as a continuation of said suction side tip rail.

6. The blade of claim 5, wherein said pressure side tip rail is discontinued in the chordal location of said aft portion.

7. The blade of claim 4, further including cooling holes in said airfoil outer wall adjacent an intersection of said outer wall and said pressure side of said blade tip surface at the chordal location of said aft portion.

8. The blade of claim 1, wherein said squealer tip rail extends substantially continuously around said blade tip surface forming a radially outwardly open squealer pocket.

9. The blade of claim 1, wherein said blade is a combustion gas turbine blade.

10. The blade of claim 1, wherein a centerline of each of said film cooling holes is slanted in a direction toward said trailing edge of said airfoil.

11. A turbine blade comprising:
an airfoil including an airfoil outer wall with pressure and suction sidewalls joined together at chordally spaced apart leading and trailing edges of said airfoil and extending radially outwardly from a blade root to a blade tip surface;
said blade tip surface including pressure and suction sides coinciding with said pressure and suction sidewalls;
a continuous squealer tip rail extending radially outwardly from and substantially continuously around said blade tip surface forming a radially outwardly open squealer pocket;
said squealer tip rail including an aft portion extending chordally between said leading edge and said trailing edge adjacent said trailing edge; and
a plurality of chordally spaced film cooling holes provided in a surface of said suction side and providing a flow of cooling fluid along said aft portion of said squealer tip rail surface at said suction side, wherein said film cooling holes are located in at least a portion of said squealer tip rail.

12. The blade of claim 11, wherein said cooling fluid exiting said film cooling holes form a film sub-boundary layer along said suction side.

13. The blade of claim 12, wherein said film cooling holes are in communication with a cooling fluid circuit within said airfoil, said film cooling holes comprising shaped holes defined by diverging walls including said at least a portion of said squealer tip rail, extending in a downstream direction of cooling fluid flow, to form said film sub-boundary layer.

14. The blade of claim 11, wherein said squealer tip rail comprises a pressure side tip rail and a suction side tip rail, said aft portion being formed as a continuation of said suction side tip rail.

15. The blade of claim 14, wherein said pressure side tip rail is discontinued in the chordal location of said aft portion.

16. The blade of claim 15, further including cooling holes in said airfoil outer wall adjacent an intersection of said outer wall and said pressure side of said blade tip surface at the chordal location of said aft portion.

17. A turbine blade comprising:
an airfoil including an airfoil outer wall with pressure and suction sidewalls joined together at chordally spaced apart leading and trailing edges of said airfoil and extending radially outwardly from a blade root to a blade tip surface;
said blade tip surface including pressure and suction sides coinciding with said pressure and suction sidewalls;
a continuous squealer tip rail extending radially outwardly from and substantially continuously around said blade tip surface forming a radially outwardly open squealer pocket;
said squealer tip rail including an aft portion extending chordally between said leading edge and said trailing edge adjacent said trailing edge; and
at least one film cooling hole in fluid communication with a cooling fluid circuit within said airfoil, said at least one film cooling hole comprising a shaped hole defined by diverging walls, extending in a downstream direction of cooling fluid flow, to form a film sub-boundary layer along said squealer tip rail surface at said suction side, wherein said at least one film cooling hole is located in at least a portion of said squealer tip rail and said diverging walls including at least a portion of said squealer tip rail.

18. The blade of claim 17, wherein said squealer tip rail comprises a pressure side tip rail and a suction side tip rail, said aft portion being formed as a continuation of said suction side tip rail.

19. The blade of claim 18, wherein said pressure side tip rail is discontinued in the chordal location of said aft portion.

20. The blade of claim 17, wherein said film sub-boundary layer formed by cooling fluid exiting said at least one film cooling hole flows in the same direction as a vortex flow formed by a hot fluid flow over said blade tip surface.

\* \* \* \* \*